(12) United States Patent
Isaksen et al.

(10) Patent No.: US 6,785,342 B1
(45) Date of Patent: Aug. 31, 2004

(54) NONLINEAR PRE-DISTORTION MODULATOR AND LONG LOOP CONTROL

(75) Inventors: David Bruce Isaksen, Mountain View, CA (US); Byron Esten Danzer, Aptos, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 719 days.

(21) Appl. No.: 09/707,419

(22) Filed: Nov. 6, 2000

(51) Int. Cl.$^7$ .............................................. H04L 27/10
(52) U.S. Cl. ........................ 375/284; 375/285; 375/296
(58) Field of Search .............................. 375/296, 297, 375/285, 219, 261, 358, 340, 221, 259; 329/304; 330/5; 455/63, 73, 91

(56) References Cited

U.S. PATENT DOCUMENTS

| | | | | |
|---|---|---|---|---|
| 4,700,151 A | * | 10/1987 | Nagata | 332/123 |
| 5,282,222 A | * | 1/1994 | Fattouche et al. | 375/260 |
| 5,751,114 A | * | 5/1998 | Dingsor | 375/222 |
| 5,905,760 A | * | 5/1999 | Schnabl et al. | 375/296 |
| 6,407,635 B2 | * | 6/2002 | Mucenieks et al. | 330/149 |
| 6,570,444 B2 | * | 5/2003 | Wright | 330/149 |
| 6,587,513 B1 | * | 7/2003 | Ichihara | 375/296 |

* cited by examiner

Primary Examiner—Khai Tran
Assistant Examiner—Qutbuddin Ghulamali
(74) Attorney, Agent, or Firm—Boris G. Tankhilevich

(57) ABSTRACT

Method for predistortion compensation for nonlinear distortion produced by the non-linear power amplifier of the QAM signal at the transmitter side of the direct digital communication channel. The out-of-band signal power is monitored by the existent receiver at the receive side of the direct propagation channel. The nonlinear distortion compensation signal is generated at the receiver/demodulator side of the direct propagation channel and transmitted across the direct propagation channel to an input of a pre-distortion block at the transmitter/modulator side of the direct propagation channel. The nonlinear distortion compensation signal is used to adjust the set of parameters of the pre-distortion block in order to minimize the out-of-band power produced by the non-linear amplifier (NLA).

13 Claims, 11 Drawing Sheets

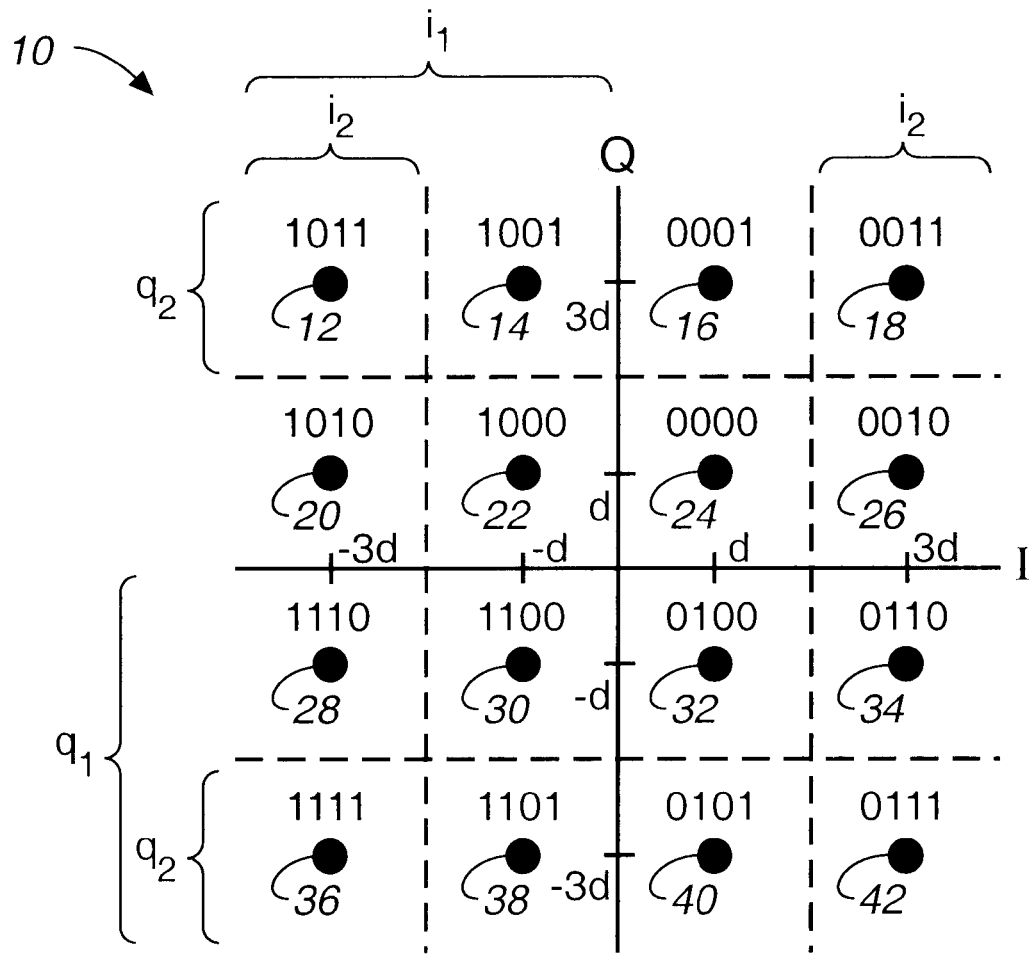
−16 QAM Constellation Diagram
FIG._1
*(PRIOR ART)*

32-QAM $I_k Q_k = 10$ | 10111 10011 | 00110 00010
10010 10101 10001 | 00100 00101 00111 $I_k Q_k = 00$
10110 10100 10000 | 00000 00001 00011
---
11011 11001 11000 | 01000 01100 01110
$I_k Q_k = 11$ | 11111 11101 11100 | 01001 01101 01010 $I_k Q_k = 01$
11010 11110 | 01011 01111

FIG._2
*(PRIOR ART)*

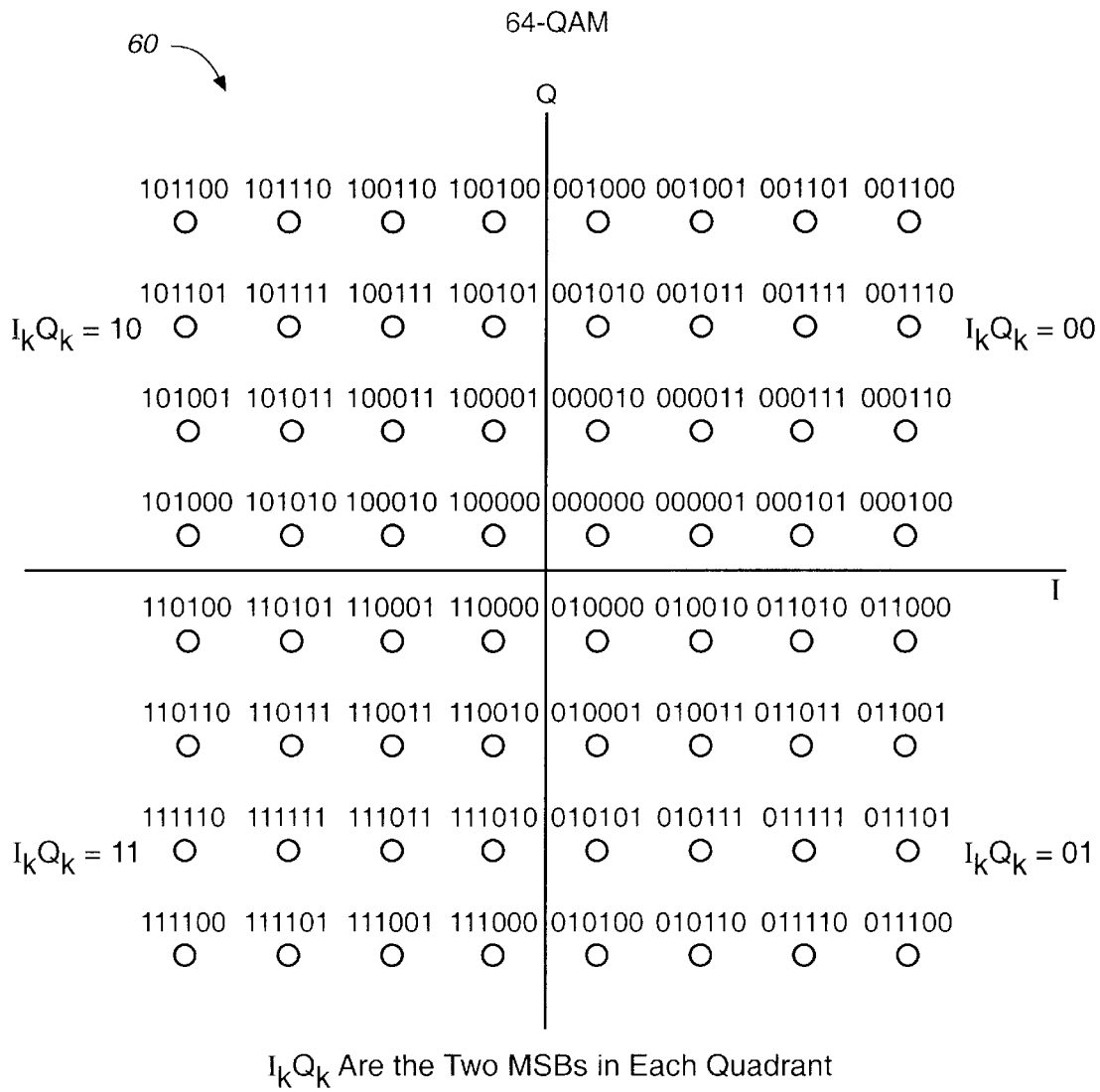
FIG._3
(PRIOR ART)

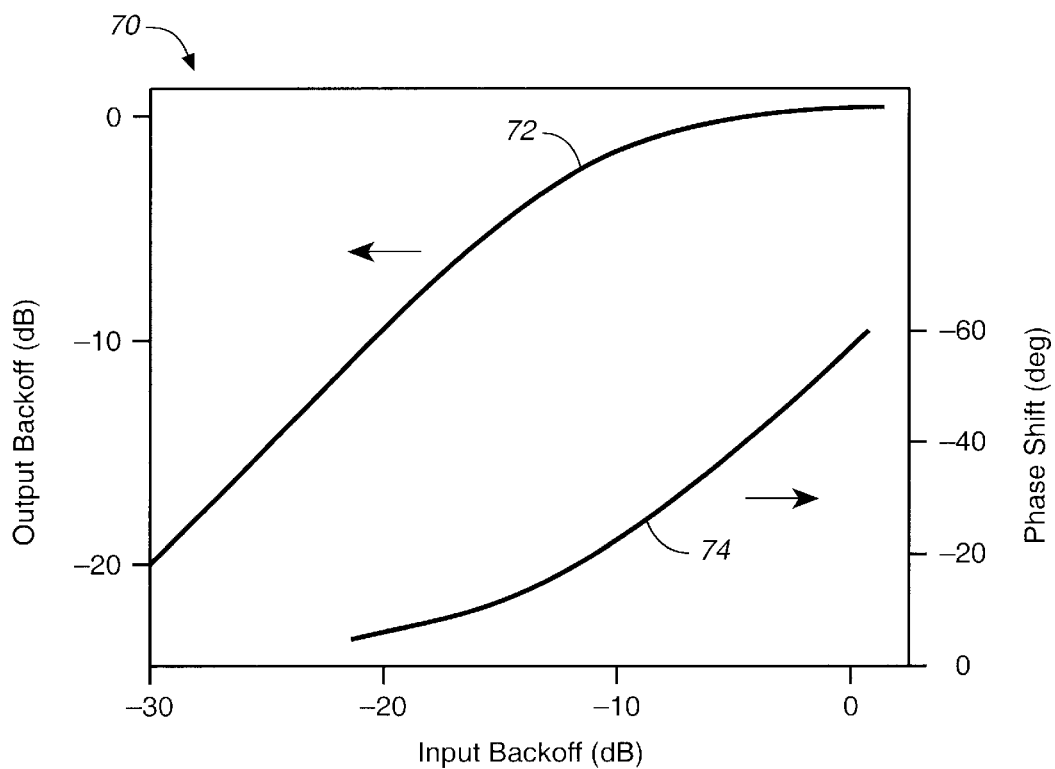
FIG._4 *(PRIOR ART)*
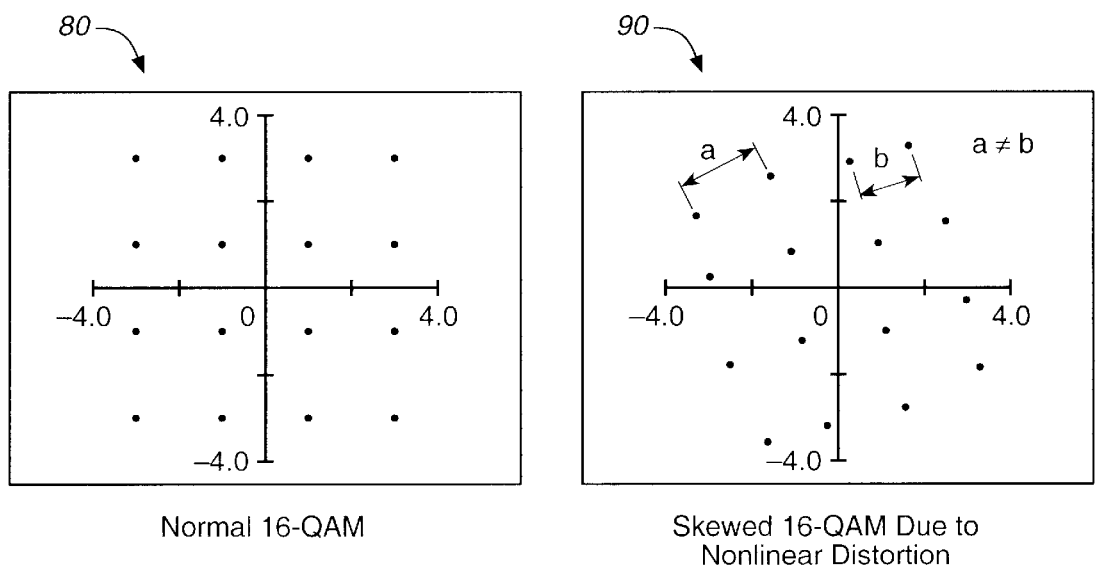
Normal 16-QAM
FIG._5A *(PRIOR ART)*
Skewed 16-QAM Due to
Nonlinear Distortion
FIG._5B *(PRIOR ART)*

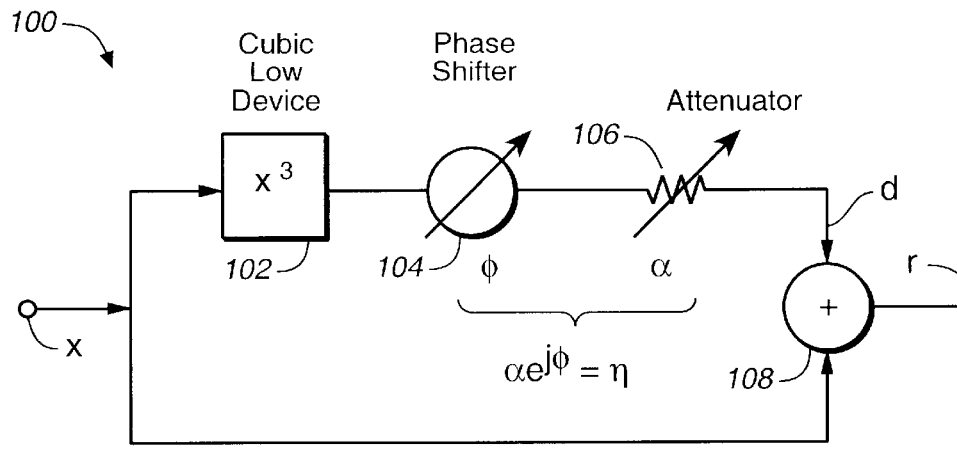
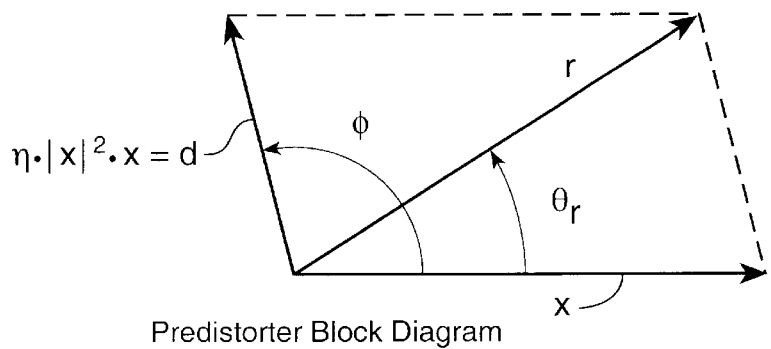
Predistorter Block Diagram
FIG._6 (PRIOR ART)
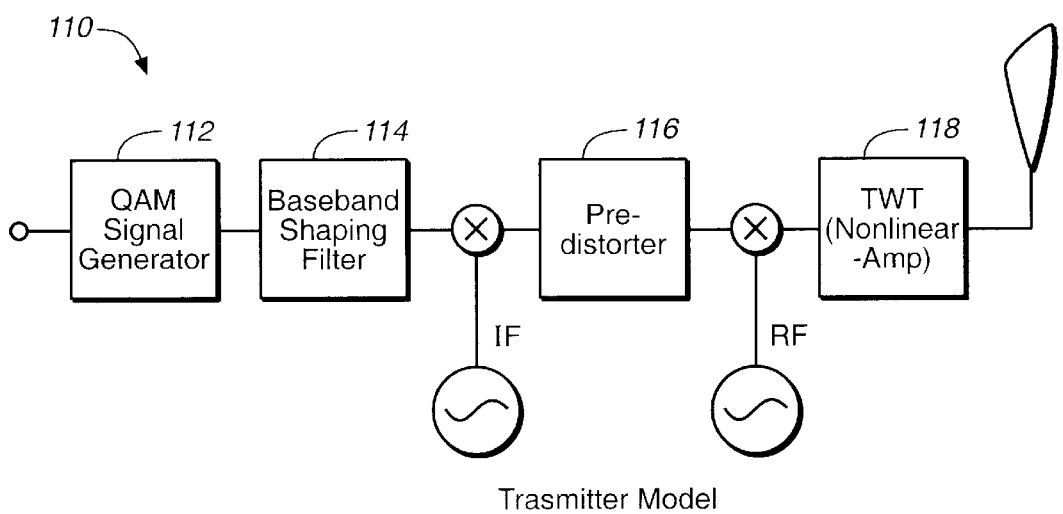
Trasmitter Model
FIG._7 (PRIOR ART)

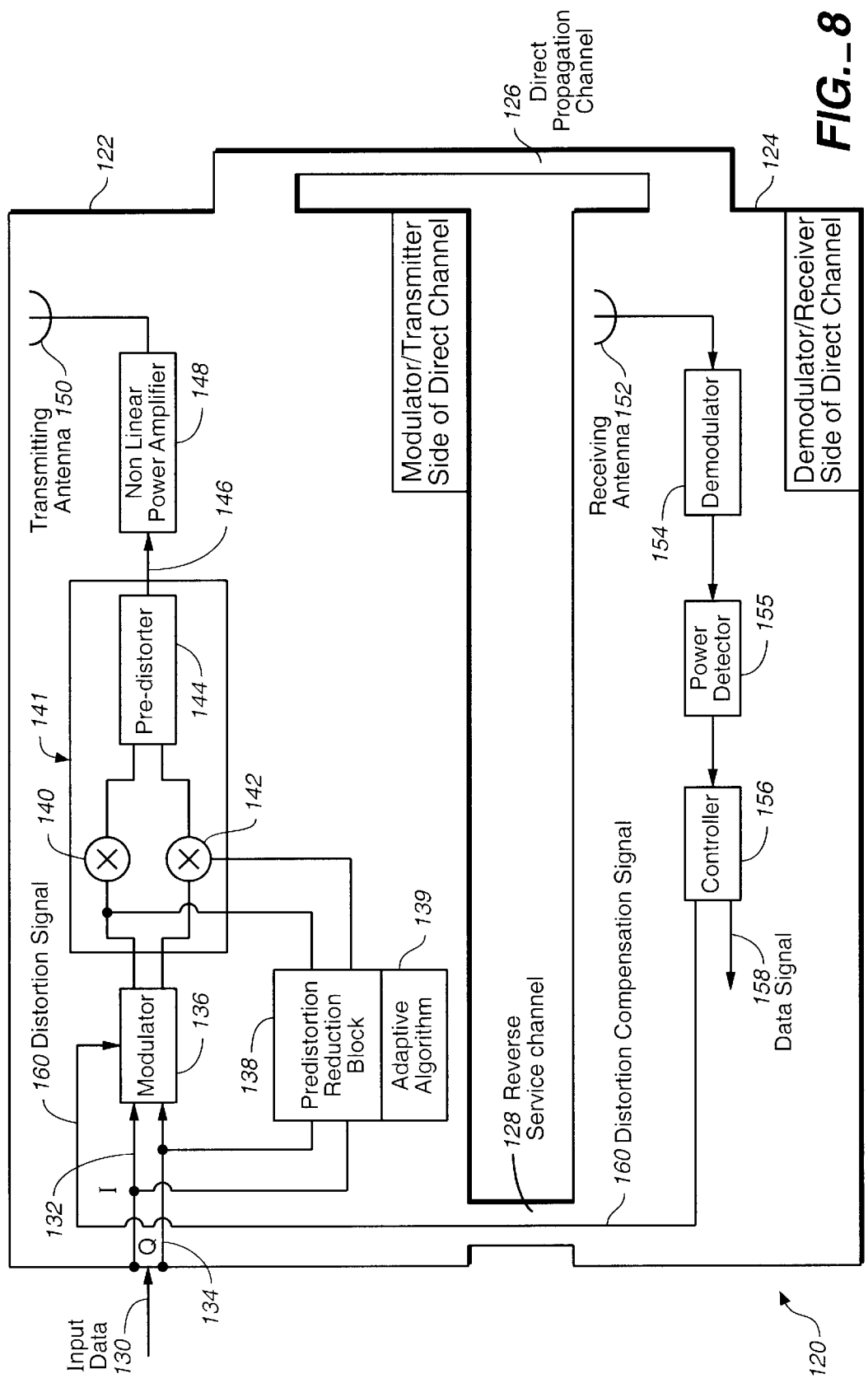
FIG._8

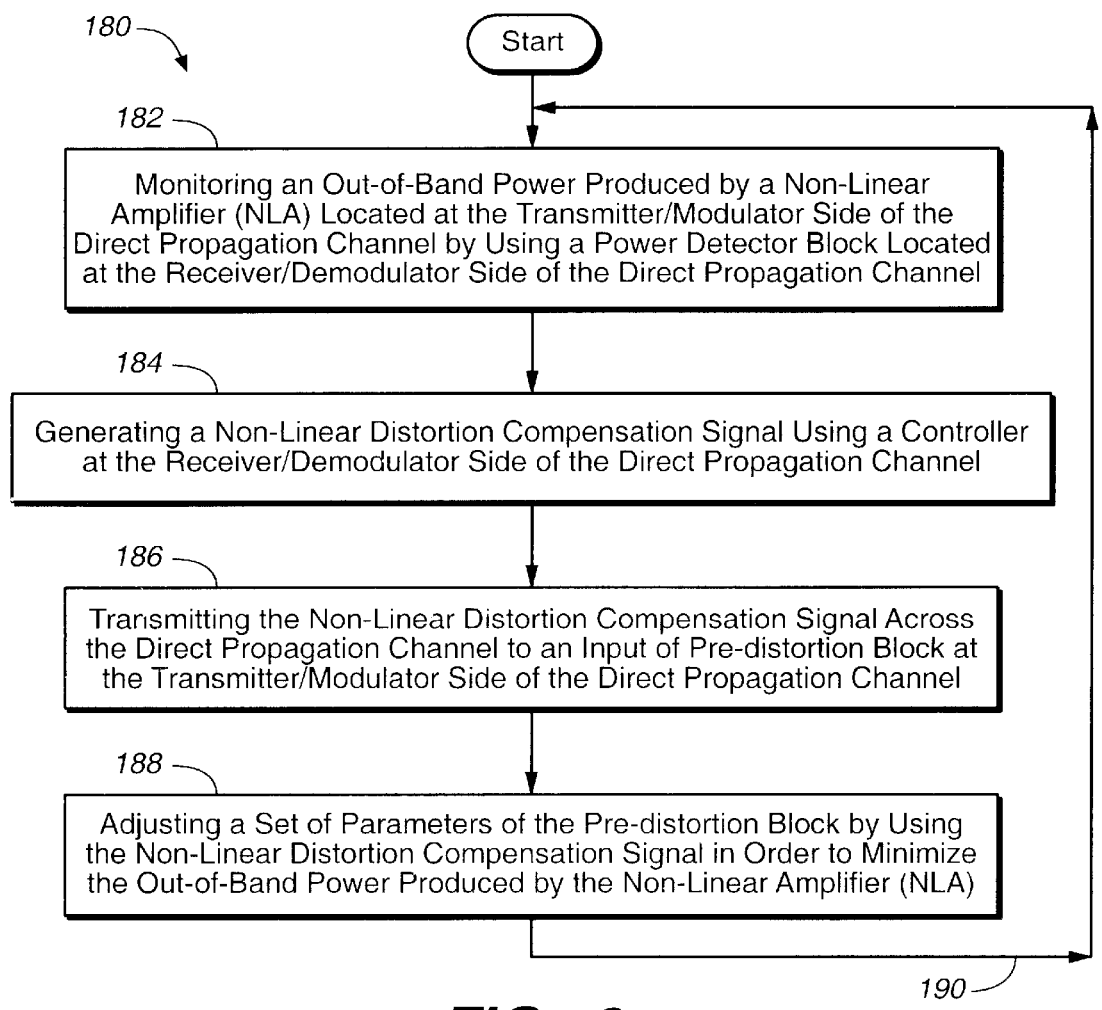
FIG._9

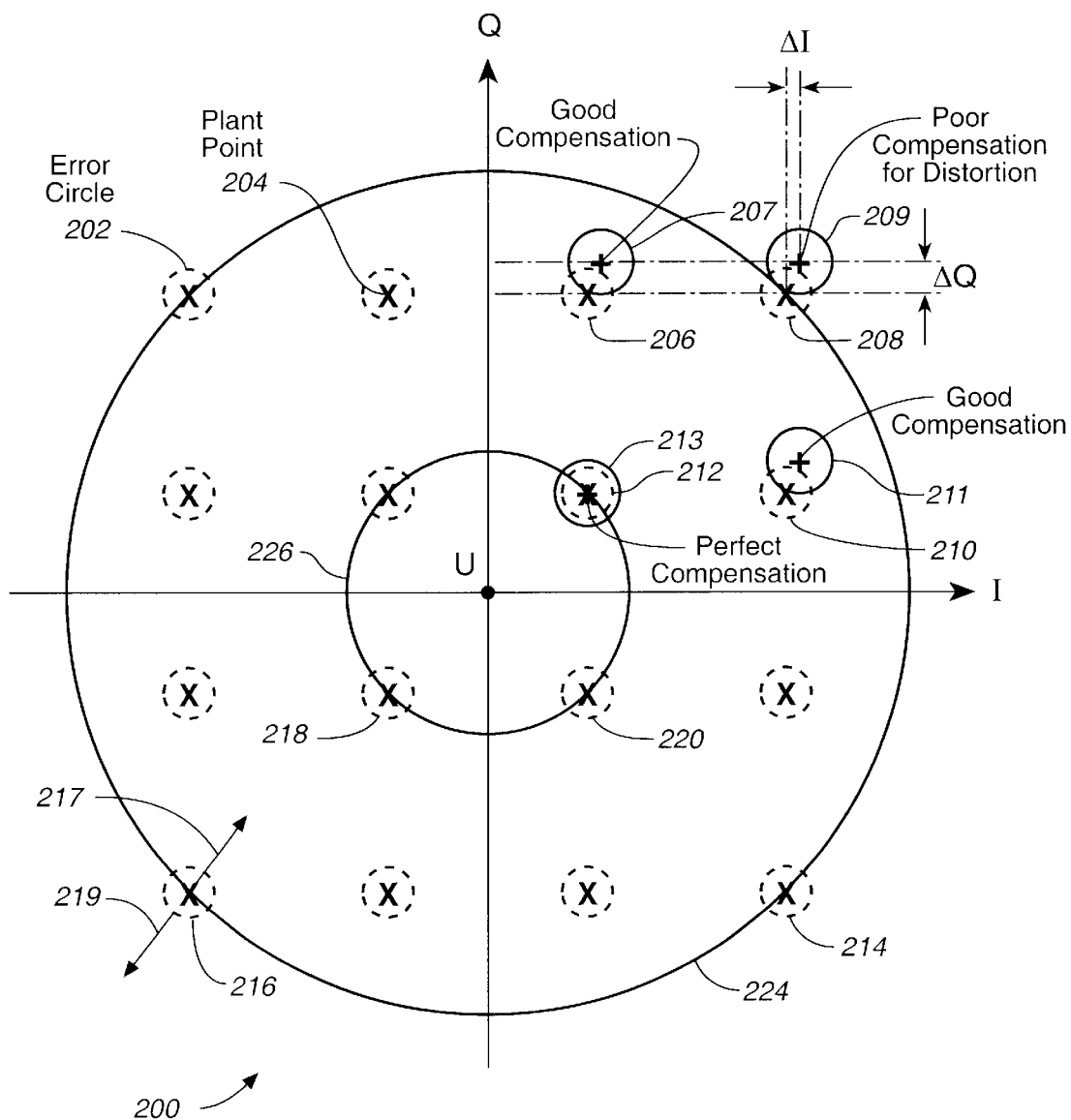
FIG._10

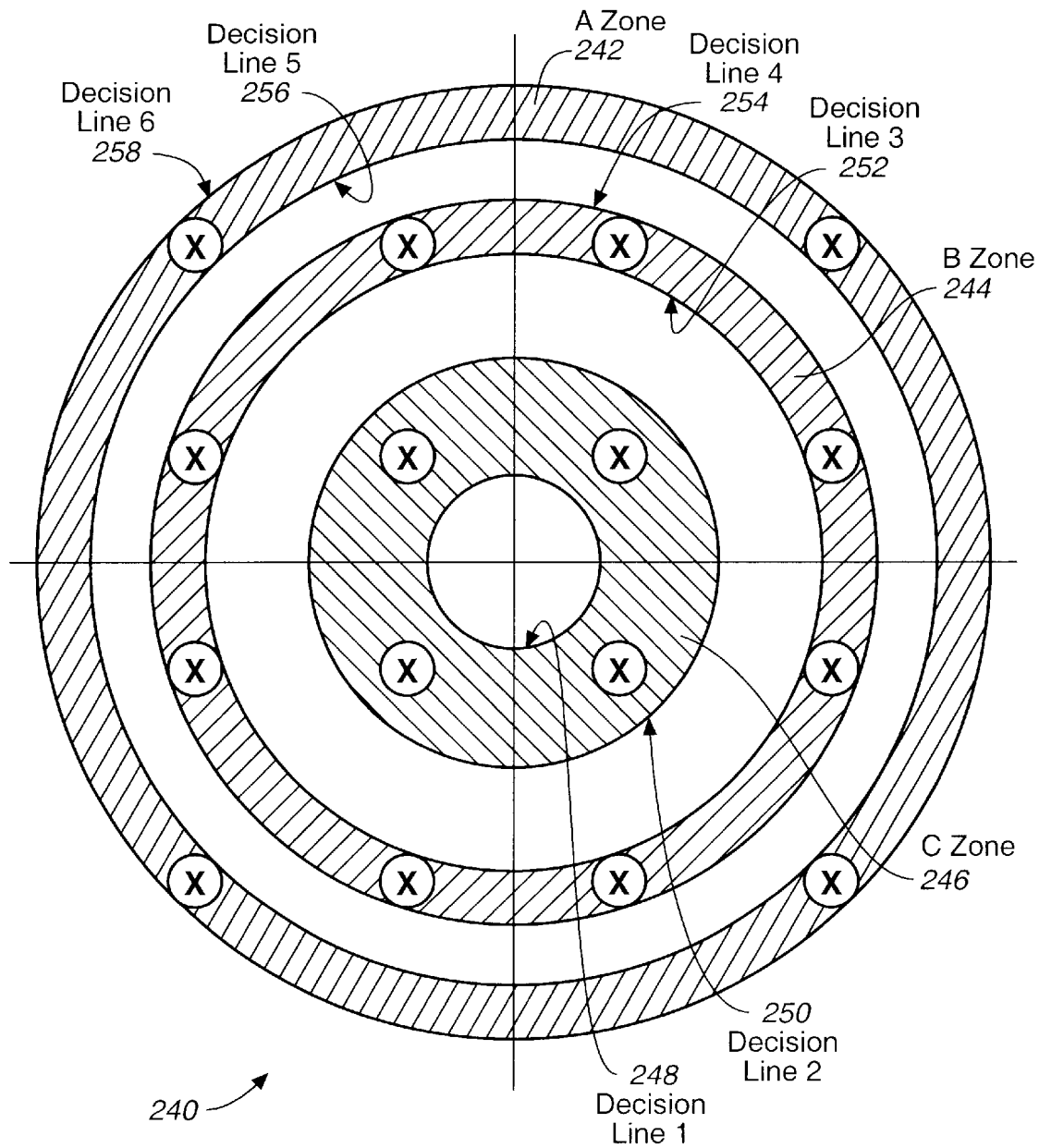
FIG._11

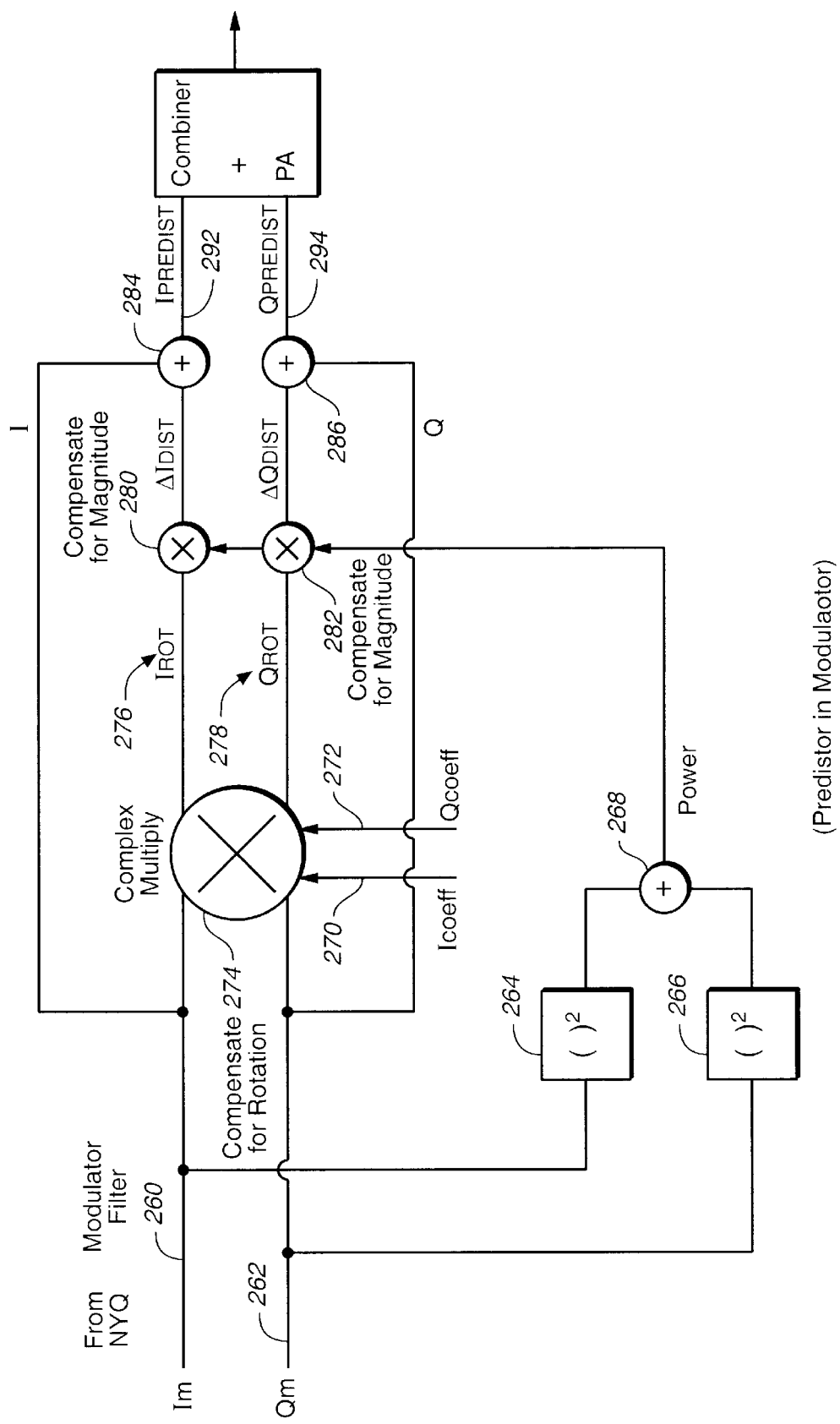
FIG._12 (Predistor in Modulaotor)

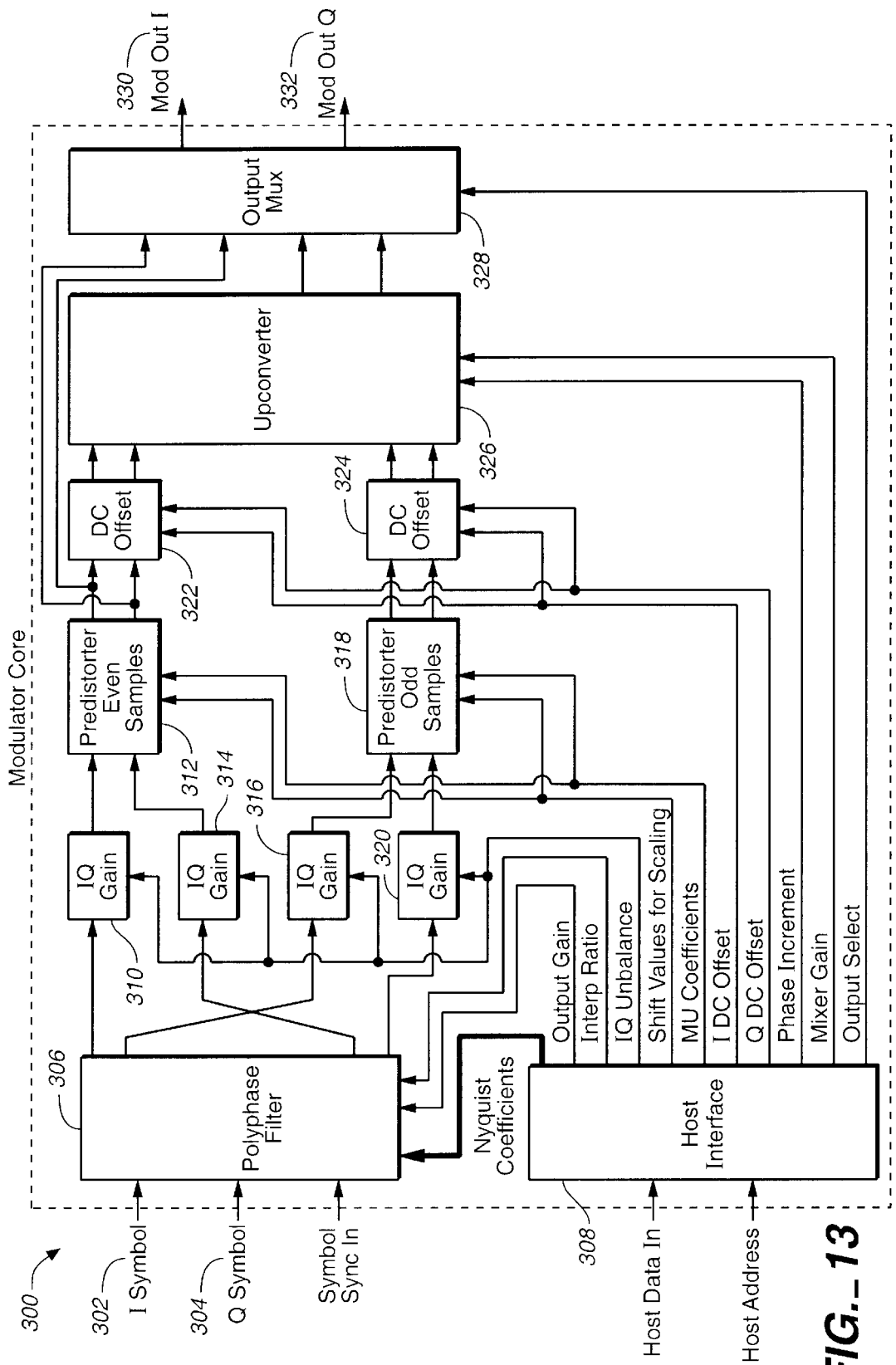
FIG._13

NONLINEAR PRE-DISTORTION MODULATOR AND LONG LOOP CONTROL

BACKGROUND OF THE INVENTION

1. Field of the Invention

The present invention relates to a linearization of power amplifiers, or more specifically, to linearization of power amplifiers by controlling a predistorter for multilevel quadrature amplitude modulation (QAM) signals via a feedback loop.

2. Discussion of the Prior Art

A major problem with bandwidth efficient QAM schemes is that their performance is strongly dependent on the linearity of the transmission system. The longer the length of the direct propagation channel, the more the need for linearity of the transmission system. A power amplifier employed in such a transmission system is the most non-linear element, and even relatively small distortion components produced by the power amplifier strongly influence the performance of the transmission system.

One prior art solution to the problem of linearization of power amplifiers is the predistortion concept. In this solution, a slowly adaptive predistorter is used to minimize the out-of-band spectral spillage due to power amplifier non-linear distortions. This method monitors the out-of-band power produced by the non-linear amplifier (NLA) and adjusts the predistorter's parameters to minimize it. More specifically, the predistorter creates the distorted signal from the undistorted modulated signal, and inputs this signal to the NLA. The adaptive feedback path downconverts the bandpass amplifier's output signal, which is then bandpass filtered to separate the out-of-band signal power from the wanted signal. The out-of-band signal power is then averaged by the power detector and used by the controller to adjust the predistorter's complex transfer characteristics to minimize the out-of-band signal power. However, to monitor the out-of-band power the prior art solution requires to place an additional receiver at the transmission side of the transmission channel. Thus, this approach has additional costs associated with placing an additional receiver at the transmission side of the channel. The prior art solution also does not take into account any nonlinear channel distortions.

In the modern long loop QAM transmission systems, the need for linearity increases drastically because the length of the transmission is determined by the residual distortions in the direct propagation channel.

What is needed is to monitor the out-of-band signal power by using the existent receiver at the receive side of the direct propagation channel. This would decrease costs and also take into account all distortion, introduced by the NLA and channel itself.

SUMMARY OF THE INVENTION

To address the shortcomings of the available art, the present invention provides a method for monitoring the out-of-band signal power by using the receiver at the receive side of the direct propagation channel.

One aspect of the present invention is directed to a method for compensation for nonlinear distortions during propagation of a QAM signal in a direct propagation channel. The direct propagation channel comprises a transmitter/modulator side and a receiver/demodulator side, and the QAM signal preferably includes a constellation of at least 16 phasors.

In the preferred embodiment, the method comprises the following steps: (a) monitoring an out-of-band power produced by a non-linear amplifier (NLA) located at the transmitter/modulator side of the of the direct propagation channel by using a power detector block located at the receiver/demodulator side of the direct propagation channel; (b) generating a nonlinear distortion compensation signal using a controller at the receiver/demodulator side of the direct propagation channel; (c) transmitting the nonlinear distortion compensation signal across the direct propagation channel to an input of a pre-distortion block at the transmitter/modulator side of the direct propagation channel; and (d) adjusting a set of parameters of the pre-distortion block by using the nonlinear distortion compensation signal in order to minimize the out-of-band power produced by the non-linear amplifier (NLA).

In one embodiment, the step (d) of adjusting the set of parameters of the pre-distortion block by using the nonlinear distortion compensation signal further includes the steps of: (d1) deriving a predistortion component from the nonlinear distortion compensation signal at the transmitter/modulator side of the direct propagation channel; and (d2) injecting the predistortion component into the input of the NLA in order to linearize an output signal generated by the transmitter/modulator block. In one embodiment, the step (d1) of deriving the predistortion component from the nonlinear distortion compensation signal at the transmitter/modulator side of the direct propagation channel further includes the steps of: (d1,1) deriving an inphase amplitude predistortion component; and (d1,2) deriving a quadrature amplitude predistortion component. In the alternative embodiment, the step (d1) of deriving the predistortion component from the nonlinear distortion compensation signal at the transmitter/modulator side of the direct propagation channel further includes the steps of: (d1,3) deriving a magnitude predistortion component; and (d1,4) deriving a rotation predistortion component.

In one embodiment, the step of deriving the rotation predistortion component further includes the step of using a plurality of fixed predistortion coefficients based on the NLA backoff power level, wherein the NLA backoff power level ensures that the NLA is in a quasi-linear mode of operation. In the alternative embodiment, the step of deriving the rotation predistortion component further includes the step of using a plurality of predistortion coefficients based on the demodulator. The operation of the NLA is affected by the external parameters including the outside temperature, outside humidity, voltage variations, etc. In one embodiment, the nonlinearity of the NLA caused by these slow changing external parameters can be minimized by adaptively updating the plurality of predistortion coefficients based on the demodulator.

In one embodiment, the step of deriving the predistortion component from the nonlinear distortion compensation signal at the transmitter/modulator side of the direct propagation channel further includes the step of calculating at least two constellation compensation errors for each phasor, wherein a first constellation compensation error is an averaged compensation error, and a second constellation compensation error is a "selective" compensation error for a plurality of "selective" phasors located within the QAM constellation. In alternative embodiment, the step of deriving the predistortion component from the nonlinear distortion compensation signal at the transmitter/modulator side of the direct propagation channel further includes the step of calculating at least two constellation compensation errors for each phasor, wherein a first constellation compensation error is an averaged compensation error, and a second constellation compensation error is an "outside" compensation error for a plurality of "outside" phasors located on a perimeter of the QAM constellation.

In the preferred embodiment, the step of calculating the averaged compensation error, and the "outside" compensation error for each "outside" phasor further includes a number of steps. At first, a "blind" mode error (BME) for each "outside" phasor is calculated as a reference error, wherein an QAM phasor is defined as a "blind" phasor if it has a maximum peak power without taking into consideration its phase angle. Next, a decision directed equalization (DDE) error for each QAM phasor relative to the a "blind" mode reference error (BME) is calculated, wherein the decision directed equalization (DDE) error for the QAM phasor indicates both an amplitude of error and a phase angle for this phasor, and wherein the phase angle for the phasor is indicative of whether the phasor is located inside or outside the "blind" power circle. Finally, a plurality of "outside" phasors located outside the "blind" power circle is utilized to calculate the predistortion compensation signal.

In the preferred embodiment of the present invention, a reverse feedback service channel is used to transmit the nonlinear distortion compensation signal back to the transmit side of the direct propagation channel.

Another aspect of the present invention is directed to a QAM data transmission system capable of compensation for nonlinear distortions during propagation of a QAM signal in a direct propagation channel. In the preferred embodiment, the system includes: (a) means for monitoring an out-of-band power produced by a non-linear amplifier (NLA); wherein the NLA is located at the transmitter/modulator side of the direct propagation channel; and wherein the means for monitoring is located at the receiver/demodulator side of the direct propagation channel; (b) means for generating a nonlinear distortion compensation signal; wherein the means for generating the nonlinear distortion compensation signal is located at the receiver/demodulator side of the direct propagation channel; (c) means for transmitting the nonlinear distortion compensation signal across the direct propagation channel to an input of a pre-distortion block at the transmitter/modulator side of the direct propagation channel; and (d) means for adjusting a set of parameters of the pre-distortion block by using the nonlinear distortion compensation signal in order to minimize the out-of-band power produced by the non-linear amplifier (NLA).

In the preferred embodiment, means for monitoring the out-of-band power further includes a power detector block located at the receiver/demodulator side of the direct propagation channel, and means for generating the nonlinear distortion compensation signal further includes a controller located at the receiver/demodulator side of the direct propagation channel.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts an ideal 16-QAM square constellation, wherein each element (phasor) is represented by a four-bit symbol comprising the in-phase bits (i1, i2) and quadrature bits (q1, q2) which are interleaved to yield the sequence (i1, q1, i2, q2).

FIG. 2 illustrates an ideal 32-QAM square constellation, wherein each element (phasor) is represented by a four-bit symbol comprising the in-phase bits (i1, i2) and quadrature bits (q1, q2) which are interleaved to yield the sequence (i1, q1, i2, q2).

FIG. 3 shows an ideal 64-QAM square constellation, wherein each element (phasor) is represented by a four-bit symbol comprising the in-phase bits (i1, i2) and quadrature bits (q1, q2) which are interleaved to yield the sequence (i1, q1, i2, q2).

FIG. 4 depicts typical TWT input-output characteristics for high capacity terrestrial microwave communications.

FIG. 5A illustrates a simplified 16-QAM diagram.

FIG. 5B depicts a 16-QAM diagram skewed by the TWT nonlinear third order distortions.

FIG. 6 illustrates a prior art equivalent IF predistorter block diagram designed to cancel the third-order distortions introduced by TWT power amplifier.

FIG. 7 depicts a prior art detection method, wherein the predistortion block is placed just before the TWT.

FIG. 8 depicts a simplified block diagram of the method of the present invention for compensation for nonlinear distortions during propagation of a QAM signal in a direct propagation channel.

FIG. 9 is an illustration of a flow chart of the method of the present invention for nonlinear distortions compensation, wherein the distortion is caused by the block NLA during propagation of a QAM signal in the direct propagation channel.

FIG. 10 depicts a real 16-QAM constellation affected by noise, distortions, and other sources of impairments.

FIG. 11 illustrates a selection algorithm of the present invention that allows one to select the most relevant distorted QAM symbols in order to generate a distortion compensation signal.

FIG. 12 depicts a preferred detailed structure of the pre-distorter block of the present invention.

FIG. 13 illustrates the embodiment of the present invention, wherein a modulator block includes a predistorter even samples block that processes only even input data samples, and a predistorter odd samples block that processes only odd input data samples, according to the disclosed above method of the present invention of FIG. 9.

DETAILED DESCRIPTION OF THE PREFERRED AND ALTERNATIVE EMBODIMENTS.

In a prior art pure digital communication system the modem's input signal is a digital signal stream from a digital source or channel encoder. If the modem's input signal is generated by an analog information source, the signal should be first bandlimited to a bandwidth of B in a low pass filter (LPF) block, before sampling can take place in an analog to digital converter (ADC) block.

According to Nyquist's fundamental theorem, the sampling frequency should be equal to or higher than twice the bandwidth B, that is $f_c \geq 2B$. If this condition is met, the original bandlimited signal can be recovered from its (½B)-spaced sampled representation with the aid of a low-pass filter having a cut-off frequency of B. For instance, most of the energy of a voice signal is concentrated at frequencies below 4 kHz, and hence speech signals are typically lowpass filtered to 4 kHz. As a result, a sampling rate of 8 kHz or higher is required in order to accurately reconstruct such a signal. In practice, most voice communication systems use a sampling rate of 8 kHz.

The analog to digital converter (ADC) takes the band-limited signal and digitizes it by converting the analog level of each sample to a discrete level. For example, in an 8-bit ADC each discrete level is represented by eight binary output bits. This provides a resolution of 256 distinct digital levels. However, a prior art ADC can convert an analog signal into its digitized counterpart using only a small number of quantized bits.

The key difference between a digital communication system and an analog one is the signal transmission techniques employed. For instance, in an analog radio the signal to be transmitted is modulated directly onto the carrier. But the internal thermal device noise always causes some loss of information. On the other hand, a digital radio system incorporates modulation and signal processing schemes that can provide an error-free digital communication link.

The prior art mapping process maps the input information bits from the digital source onto the in-phase (I) and quadrature (Q) carriers. The mapping can be represented by the so-called constellation diagram. A constellation is the resulting two-dimensional plot when the amplitudes of the I and Q levels of each of the points which could be transmitted (the symbols) are drawn in a rectangular coordinate system.

FIG. 1 depicts an ideal (without noise, distortions, or other impairments) 16-QAM square constellation 10, wherein each element (phasor) (12–42) is represented by a four-bit symbol comprising the in-phase bits (i1, i2) and quadrature bits (q1, q2) which are interleaved to yield the sequence (i1, q1, i2, q2). To maximize the average energy of the phasors, quaternary quadrature components I and Q are Gray encoded by assigning the bits 01, 00, 10, and 11 to the levels 3d, d, –d, and –3d, respectively. For the geometry of FIG. 1, the average transmitted energy is as follows:

$$E_0 = (2d^2 + 2 \times 10d^2 + 18d^2)/4 = 10 \times d^2. \quad (1)$$

For any other phasor arrangement the average energy will be less and the signal to noise ratio (SNR) required to achieve the same bit error rate (BER) will be higher. The I and Q signals should be bandlimited before transmission in order to contain the spectrum within a limited band and to minimize interference with other users or systems sharing the spectrum.

Similarly, FIG. 2 depicts an ideal (without noise, distortions, or other impairments) 32-QAM square constellation 50, and FIG. 3 depicts an ideal (without noise, distortions, or other impairments) 64-QAM square constellation 60, wherein each element (phasor) is represented by a four-bit symbol comprising the in-phase bits (i1, i2) and quadrature bits (q1, q2) which are interleaved to yield the sequence (i1, q1, i2, q2).

An ideal linear-phase low pass filter with a cut-off Nyquist frequency of $f_N = f_S/2$, wherein $f_S = 1/T$ is the signaling frequence, and wherein T is the signaling interval duration, would retain all the information conveyed by the quadrature components I and Q within a compact frequence band. Due to the linear phase response of the filter all frequency components would exhibit the same group delay. Because such a filter has a sinc function shaped impulse response with equi-distant zero-crossings at the sampling instants, it does not result in inter-symbol-interference (ISI). On the other hand, all practical lowpass (LP) filters, like an infinite impulse response (IIR) filter, or a finite impulse response (FIR) filter, have impulse responses with non-zero values at the equi-spaced sampling instants, introduce ISI, and degrade the BER performance. To minimize the distortions, and to maximize the SNR, the so-called matched filtering can be used, wherein the Nyquist characteristic is divided between two identical filters, each characterized by the square root of the Nyquist shape.

Once the analog I and Q signals have been generated and filtered, they are modulated by an I-Q modulator. The I channel is modulated, or mixed, with an intermediate frequency (IF) signal, wherein the Q channel is modulated by the IF signal that is 90 degrees out of phase. This process allows both I and Q signals to be transmitted over a single channel within the same bandwidth using quadrature carriers.

Finally, the combined signal is radio frequency modulated, so that the resulting signal has a carrier frequency suitable for the transmission over the transmission channel, and power amplified by a power amplifier, so that the resulting signal has enough energy to propagate over the transmission channel.

The RF demodulator mixes the received signal down to the IF for the I-Q demodulator. The recovered IF spectrum is similar to the transmitted one, but with the additive noise floor. The I-Q demodulation takes place in the reverse order to the I-Q modulation process. The signal is split into two paths, with each path being mixed down with IF's that are 90 degrees apart. The recovered I component should be near identical to that transmitted, with the only difference being caused by noise.

Once the analog I and Q components have been recovered, they should be digitized. This is done by the bit detector that determines the most likely bit (MLB) transmitted by sampling the I and Q signals at the correct sampling instants and compares them to the legitimate I and Q values of –3d, –d, d, 3d in the case of a square QAM constellation (10 of FIG. 1). From each I and Q decision two bits are derived, leading to a 4-bit 16-QAM symbol. The four recovered bits are then passed to the digital-to analog converter (DAC).

In the existing prior art, a traveling wave tube (TWT) amplifier is the most popular non-linear amplifier (NLA) used for the microwave power amplification purposes. The TWT is used primarily in high power amplifiers for high capacity digital transmissions. The nonlinear characteristics of TWT amplifiers cause problems, as a pulse shape distortion results in the diminution of performance. Indeed, even if an original modulation signal is band limited, inter modulation results in an out-of-band power leakage. The out-of-band power leakage causes an increase in inter symbol interference due to a receiver band-limiting effect. The out-of-band power leakage also causes interference in adjacent channels which cannot be completely eliminated by RF transmitter bandpass filtering. Thus, without nonlinear compensation, efficient high capacity digital transmission cannot be achieved without operation at large backoff.

Predistortion is one of the best of the many methods of nonlinear compensation. Using this technique, inverse distortion is added to the non-linear amplifier (NLA) input signal to cancel the non-linear distortions. The non-linear distortions of the NLA varies with the outside temperature, humidity, amplifier parameters aging, etc. Therefore, the operation point of the NLA has to be adjusted to compensate for those changes in those parameters that are external to the non-linear transmission circuit. In the prior art, the automatically controlled predistorter is capable of automatically adjusting the operation point of the NLA to take care of changes in these external parameters when the digital input signal, for instance the quadrature amplitude modulation (QAM) signal, has a finite number of signal levels (please, see discussion above).

Typical TWT input-output characteristics 70 for high capacity terrestrial microwave communications are shown in FIG. 4. Conventional TWT nonlinear distortions can be characterized by a third-order nonlinear characteristics, that is gradual saturation characteristics 72 for AM/AM conversion, and monotonic characteristics 74 for AM/PM conversion.

FIG. 5A illustrates a simplified 16-QAM diagram 80, wherein a 16-QAM diagram skewed by TWT nonlinear distortion 90 is depicted in FIG. 5B. More specifically, FIG. 5B illustrates how the QAM signals are skewed by TWT nonlinear distortion by depicting two different distances "a" and "b" between different pairs of QAM signals, and by depicting all 16 QAM signal points being rotated counter-clockwise around the origin. The nonlinear distortion becomes more pronounced as QAM signal points increase.

The prior art methods of prerotation and derotation are the main methods of compensation similar to the predistortion method. Using prerotation, the previously skewed QAM signal points are generated to cancel anticipated TWT nonlinearity. This skewed QAM signal is then filtered and fed into the TWT. If the anticipation is correct, the QAM signal points become orthogonal to each other at the TWT output. However, the pre-rotation is different from pre-distortion, because while the pre-distortion reduces out-of-band power, the pre-rotation does not reduce the out-of-band power. Indeed, the derotation is the less effective method because it corrects the distorted signal constellation merely to make it match an orthogonal signal decision threshold on the receiver side. A received noise interferes with the correction process, and the nonlinear compensation becomes inadequate as the received noise increases. Thus, the predistortion is the best practical compensation technique.

FIG. 6 depicts a prior art equivalent IF predistorter block diagram 100 designed to cancel the third-order distortions introduced by the TWT power amplifier. A cubic law device produces the third-order distortion T from a complex input signal $X_i$:

$$T = X_i |X_i|^2; \quad (2)$$

and a complex coefficient $\eta$ is generated by a phase shifter and an attenuator as follows:

$$\eta = \alpha \cdot e^{j\phi}. \quad (3)$$

An inverse third-order distortion component d is composed of T and $\eta$ as follows:

$$d = \acute{\eta} \cdot T = \acute{\eta} \cdot X_i |X_i|^2. \quad (4)$$

Consequently, the predistortion output $\acute{r}$ is expressed in the following equation:

$$\acute{r} = X_i + d = X_i + \acute{\eta} \cdot X_i |X_i|^2. \quad (5)$$

An optimum $\eta$ should be determined so as to effectively cancel TWT third-order distortion. Assuming that the nonlinearities of both TWT and the predistorter have no memories in a compensation algorithm, in the prior art detection method, the predistortion block 116 is placed just before the TWT 118, as shown in FIG. 7.

For simplifying the control method derivation, pulse shaping is assumed to be established entirely at the transmitting baseband shaping filter 114, as shown in FIG. 7. If this is the case, the filter output becomes equal to the filter output at the maximum eye opening timing. That is, the transmitted signal X becomes equal to the predistorter input $X_i$ at that timing. Therefore, the filtering effect can be disregarded.

FIG. 8 depicts a simplified block diagram 120 of the method of the present invention for compensation for nonlinear distortions during propagation of a QAM signal in a direct propagation channel 126. The input data signal 130 is converted into a quadrature amplitude modulation (QAM) signal including a constellation of at least 16 phasors. The direct propagation channel 126 further comprises a transmitter/modulator side 122 and a receiver/demodulator side 124.

As was stated above, the nonlinear power amplifier (NLA) 148 introduces the nonlinear distortion signal into the direct propagation channel 126. In one embodiment of the present invention, the NLA comprises a TWT amplifier. If this is the case, the TWT input-output characteristics are shown in FIG. 4, and the nonlinear distortions introduced by the TWT amplifier are of the third order of magnitude. Please, see the discussion above.

In the preferred embodiment of the present invention, as opposed to the prior art distortion compensation schemes, the distortion compensation signal 160 is generated at the receiver/demodulator side 124 of the propagation channel, and is sent back to transmitter/modulator side 122 by utilizing the reverse service channel 128. The present invention thus allows a user to utilize the existent receiver at the receiver/demodulator side 124 of the propagation channel 126 in order to detect the distortion signal without having to put an additional receiver at the transmitter part of the propagation channel for purposes of detection of the distortion signal introduced by the NLA. This configuration reduces the costs and simplifies the design of the modulator/transmitter side of the propagation channel because the need for additional receiver at the transmitter side of the channel is eliminated.

FIG. 9 is an illustration of a flow chart 180 of the method of the present invention for nonlinear distortions compensation, wherein the distortion is caused by the block NLA (148 of FIG. 8) during propagation of a QAM signal 130 in the direct propagation channel. In one embodiment, the QAM signal comprises a 16-QAM square constellation as depicted in FIG. 1, wherein each phasor is represented by a four-bit symbol comprising the in-phase bits (i1, i2) and quadrature bits (q1, q2) which are interleaved to yield the sequence (i1, q1, i2, q2). (The 16-QAM is a minimum constellation because the 4-QAM signal does not have envelope variations).

In another embodiment, the QAM signal comprises a 32-QAM square constellation as shown in FIG. 2, wherein each element (phasor) is represented by a four-bit interleaved sequence (i1, q1, i2, q2). Yet, in one more embodiment, the QAM signal comprises a 64-QAM square constellation as shown in FIG. 3, wherein each element (phasor) is also represented by a four-bit interleaved sequence (i1, q1, i2, q2). It is understood by those skillful in the art, that the QAM signal can also comprise a 128-QAM constellation, a 256-QAM constellation, or any other square N-QAM constellation, wherein N is an integer $2^K$, and wherein K is an integer greater than 2.

In the preferred embodiment of the method (shown as the flow chart 180 of FIG. 9) of the present invention, in the first step (182), the power detector block 155 is used to monitor the out-of-band power leakage caused by the non-linear amplifier block NLA (148 of FIG. 8). In the preferred embodiment of the present invention, the power detector block 155 is located at the receiver/demodulator side 124 of the direct propagation channel. In one embodiment, the direct propagation channel comprises a direct propagation microwave channel. In another embodiment, the direct propagation channel comprises a direct propagation fiberoptic channel.

In one embodiment, the NLA amplifier comprises a TWT amplifier that, as was stated above, causes a small distortion signal of the third order of non-linearity. However, even a small third-order distortion signal can significantly degrade the digital data signal at large distances in a standard microwave channel. In the case of a fiberoptic direct propagation channel, a small third-order distortion signal can cause even more severe degradation of a data signal than in the case of a microwave channel because the fiberoptic channels are designed to carry the data and voice digital traffic over very large distances, like an interstate data traffic, or an intercontinental underwater data traffic, so that even a very small distortion can significantly degrade the transmitted data. The better the compensation of a non-linear distortion signal introduced by the nonlinear power amplifier (NLA), or by a direct propagation channel itself, the longer the distance a digital data signal can travel in such "compensated" direct propagation channel.

In the next step of the method of the present invention (184 of FIG. 9), a nonlinear distortion compensation signal is generated at the receiver/demodulator side 124 of the direct propagation channel.

FIG. 10 depicts a real 16-QAM constellation 200 affected by noise, distortions, and other sources of impairments. A real 16-QAM symbol has a plant point 204, and belongs to an error circle 202, if real 16-QAM constellation 200 is affected only by noise, because noise is substantially the same for each symbol. However, the constellations points (216, 214) that are further away from the origin than the constellations points (212, 220) have the largest power, that is the signal-to-noise (SNR) ratio is the biggest one for the points belonging to the largest circle 224, as compared to the SNR for the symbols belonging to the smallest circle 226.

If in addition to noise, the QAM constellation is affected by a distortion, the circles shift from their symmetrical positions around plant points. If the distortion is perfectly compensated, the circle shifts back to its unshifted position (for instance, circle 213 is shifted back to its unshifted position 212). If the compensation is insufficient, or poor, the circle remains shifted as opposed to its unshifted position (for instance, circle 209 remains shifted after poor compensation as compared to its unshifted position 208). By measuring the inphase ($\Delta I$) (216 of FIG. 10) and quadrature ($\Delta Q$) (214 of FIG. 10) components of the deviation from the shifted plant point position to unshifted plant point for each constellation QAM point, one can determine the distortion signal.

In one embodiment of the present invention, a precise nonlinear distortion compensation signal is generated by a controller 156 of FIG. 8 that takes into account an inphase ($\Delta I$) and a quadrature ($\Delta Q$) distortion components for each QAM symbol. Thus, in this embodiment, the Complete Distortion Compensation (CDC) QAM signal is a sum of QAM distortion compensation signals generated separately for each symbol from a QAM constellation:

(CDC) QAM=$\Sigma$QAM distortion compensation signal$_{Symbol}$=$\Sigma$ [($\Delta I$)+($\Delta Q$)]2=$\Sigma$\{[Symbol$_I$–Plant$_I$]$^2$+[Symbol$_Q$–Plant$_Q$]$^2$\}   (6)

Thus, the CDC QAM signal requires measurement of an inphase ($\Delta I$) and a quadrature ($\Delta Q$) distortion components for each QAM symbol, and therefore is the signal that is very difficult to generate. The CDC QAM signal is also the signal most difficult to use in order to derive the predistortion signal (please, see the discussion below) because for each symbol the compensation signal should be different.

In another embodiment, a plurality of inphase ($\Delta I$) and quadrature ($\Delta Q$) distortion components for each plant point of a QAM symbol is averaged in order to determine the average distortion compensation signal. In this embodiment, which is called a directed decision equalization (DDE) mode, the distortion compensation signal can be calculated as follows:

DDE distortion compensation signal==<W(symbol) $\Sigma_{All\ Symbols}$ \{[Symbol$_I$–Plant$_I$]$^2$+[Symbol$_Q$–Plant$_Q$]$^2$\}>;   (7)

wherein W(symbol) is a weighting function depending on a symbol.

In one embodiment, the weighting function W(symbol) is chosen in such a way that only "outside" symbols that belong to the outside power peak circle (224 of FIG. 10) are taken into account in order to generate a distortion compensation signal. In this embodiment, the weighting function is as follows:

$$W(symbol) = \begin{cases} 1; \text{ if symbol belongs to the outside power circle;} \\ 0; \text{ if symbol does not belong to the outside power circle.} \end{cases} \quad (8)$$

However, it is also important to know whether the symbol that belongs to the power peak circle 224 is shifted inside or outside the power peak circle 224. To take care of this problem, one should calculate the Blind Mode Error compensation signal for each outside symbol as follows:

Blind Mode Error distortion compensation signal$_{Outside\ Symbol}$== \{[Symbol$_I$+Symbol$_Q$]$^2$–[Power$_{Peak\ Circle}$]\}.   (9)

In one embodiment of the present invention, for 16-QAM, as depicted in FIG. 11, one utilizes a number of decision lines Decision_Line_1 248, Decision_Line_2 250, Decision_Line_3 252, Decision_Line_4 254, Decision_Line_5 256, and Decision_Line_6 258, a number of critical shifts, or Dispersions (DIS) (dispersion is a measure of a symbol shift) \{DIS-1 for A-zone; DIS-2 for B-zone; and DIS-3 for C-zone\} in order to build an algorithm that allows a user to select the most relevant distorted QAM symbols in order to generate an optimum distortion compensation signal. A-zone 242 is a zone that lies in between Decision_Line_5 256, and Decision_Line_6 258. Similarly, B-zone 244 is a zone that lies in between Decision_Line_4 254, and Decision_Line_3 253, and C-zone 246 is a zone that lies in between Decision_Line_1 248, and Decision_Line_2 250. In one embodiment of the present invention, the selection algorithm that allows to select the most relevant shifted symbols (MRSS) in order to build the distortion compensation signal is as follows:

$$\text{Most Relevant Distortion Compensation Signal}_{MRSS} = \begin{cases} \Sigma_{A\text{-}zone}\{[MRSS_I + MRSS_Q]^2\}, & \text{if } MRSS \text{ is in A-zone;} \\ \Sigma_{B\text{-}zone}\{[MRSS_I + MRSS_Q]^2\}, & \text{if } MRSS \text{ is in B-zone;} \\ \Sigma_{C\text{-}zone}\{[MRSS_I + MRSS_Q]^2\}, & \text{if } MRSS \text{ is in C-zone.} \end{cases} \quad (10)$$

Referring back to FIG. 9, at step (184) the nonlinear distortion compensation signal, calculated according to one of above-giving formulas (7, 9, or 10), is transmitted across the direct propagation channel to an input of a pre-distortion block (160 of FIG. 8) at the transmitter/modulator side of the direct propagation channel. In the preferred embodiment of the present invention, the nonlinear distortion compensation signal is transmitted across the direct propagation channel using a reverse feedback service channel (128 of FIG. 8). In one embodiment, the reverse feedback service channel further comprises a microwave reverse service channel. In another embodiment, the reverse feedback service channel further comprises a fiberoptic reverse service channel.

Finally, at step (188 of FIG. 9), a set of parameters of the pre-distortion block (141 of FIG. 8) is adjusted by using the nonlinear distortion compensation signal (160 of FIG. 8) in order to minimize the out-of-band power produced by the non-linear amplifier (NLA) (148 of FIG. 8). The prerequisite to the step (188 of FIG. 9) is the step (not shown in the flow chart 180) of deriving the predistortion components from the nonlinear distortion compensation signal. In one embodiment of the present invention, the step of deriving the predistortion component from the nonlinear distortion compensation signal at the transmitter/modulator side of the direct propagation channel further includes the steps (a) deriving an inphase amplitude predistortion component; and (b) deriving a quadrature amplitude predistortion component. In another embodiment of the present invention, the step of deriving the predistortion component from the nonlinear distortion compensation signal at the transmitter/modulator side of the direct propagation channel further includes the steps (c) deriving a magnitude predistortion component; and (d) deriving a rotation predistortion component.

FIG. 12 depicts a detailed structure of the pre-distorter block 141 (see also FIG. 8). In one embodiment, the predistortion inphase coefficient $I_{Predistorter}$ 292 and the predistortion quadrature coefficients $Q_{Predistorter}$ 294 are as follows:

$$I_{Predistorter} = I + \Delta I; \quad (11)$$

$$Q_{Predistorter} = Q + \Delta Q; \quad (12)$$

wherein $\Delta I$ and $\Delta Q$ represent the inphase and quadrature pre-distorter compensation signals for each relevant symbol. In one embodiment of the present invention, the inphase and quadrature pre-distorter compensation signals for each relevant symbol can be expressed as inphase and quadrature components of the rotation angles:

$$\Delta I = I_{Rotation} \cdot \text{Power}; \quad (13)$$

$$\Delta Q = Q_{Rotation} \cdot \text{Power}; \quad (14)$$

$$\text{Power} = I^2 + Q^2; \quad (15)$$

wherein it is assumed that the main component in the distortion compensation signal is the rotation of the relevant symbols, so that the relevant symbols can revert back to their corresponding unshifted positions after the pre-distorter compensation signals are added to the input data signal.

Referring still to FIG. 12, the Square blocks 264 and 266 are configured to generate the Power element (according to Equation 15), wherein the Complex Multiply block 274 is configured to generate the inphase and quadrature rotation predistortion components $I_{Rotation}$ and $Q_{Rotation}$ that are used in Equations 13 and 14.

In one embodiment of the present invention, the Complex Multiply block 274 generates the inphase and quadrature rotation predistortion components $I_{Rotation}$ and $Q_{Rotation}$ using a plurality of fixed predistortion coefficients $I_{Coefficients}$ 270 of FIG. 12 and $Q_{Coefficients}$ 272 of FIG. 12 as follows:

$$I_{Rotation} = I \cdot I_{Coefficients} - Q \cdot Q_{Coefficients}; \quad (16)$$

$$Q_{Rotation} = I \cdot Q_{Coefficients} + Q \cdot I_{Coefficients}. \quad (17)$$

In one embodiment of the present invention, the plurality of fixed predistortion coefficients $I_{Coefficients}$ 270 of FIG. 12 and $Q_{Coefficients}$ 272 of FIG. 12 are fixed based on the NLA backoff power level, wherein the NLA backoff power level ensures that the NLA is in a quasi-linear mode of operation. In this embodiment, at first, the characteristics of the non-linear power amplifier (NLA 148 of FIG. 8) are measured to ensure that the NLA is in a quasi-linear mode of operation, and secondly, the predistortion coefficients $I_{Coefficients}$ 270 of FIG. 12 and $Q_{Coefficients}$ 272 of FIG. 12 are applied to the block Complex Multiply 174 to minimize the out-of-band power produced by the NLA 148.

In the alternative embodiment of the present invention, the plurality of fixed predistortion coefficients $I_{Coefficients}$ 270 of FIG. 12 and $Q_{Coefficients}$ 272 of FIG. 12 are based on the demodulator/receiver side of the direct propagation channel (124 of FIG. 8). More specifically, in one embodiment, the plurality of fixed predistortion coefficients $I_{Coefficients}$ 270 of FIG. 12 and $Q_{Coefficients}$ 272 of FIG. 12 are derived from the most relevant constellation points according to Equation 10. In another embodiment, the plurality of fixed predistortion coefficients $I_{Coefficients}$ 270 of FIG. 12 and $Q_{Coefficients}$ 272 of FIG. 12 are derived from the "outside" constellation points (216 of FIG. 10) according to Equation 9.

As was stated above, by adjusting the set of parameters of the pre-distortion block 141 of FIGS. 8 and 12, including the plurality of predistortion coefficients ($I_{Coefficients}$ 270 and $Q_{Coefficients}$ 272), the out-of-band power produced by the NLA 148 (of FIG. 8) is minimized. If the disclosed above method is the only method used to minimize the nonlinear distortions produces by the NLA and other sources of nonlinearities, then the residual nonlinear distortion determines how far the digital data signal can travel along the direct propagation channel, that is determines the length of the channel itself.

In the real world, the operating point of the nonlinear power amplifier (NLA) can shift depending on a number of slow changing external parameters that can include an outside temperature (depending ion the time of the day), outside humidity, voltage variations, etc. In the preferred embodiment of the present invention, the plurality of pre-distortion coefficients ($I_{Coefficients}$ 270 and $Q_{Coefficients}$ 272) based on the demodulator is adaptively updated in order to take into consideration these slow changing external parameters in order to optimize the predistortion coefficients and thus to minimize the nonlinear distortion caused by the NLA in the direct propagation channel. In one embodiment, the nonlinear distortion compensation signal is fed back at a fixed time interval, that is periodically. In another embodiment, the nonlinear distortion compensation signal is fed back at a variable time interval, wherein the variable time interval depends on the external parameter.

In one embodiment of the present invention, as depicted in FIG. 13, a modulator block 300 includes a predistorter even samples block 312 that processes only even input data samples according to the disclosed above method of the present invention (180 of FIG. 9), and a predistorter odd samples block 318 that processes only odd input data samples according to the disclosed above method of the present invention (180 of FIG. 9). This is possible because the circuitry has no memory. The separation of odd and even samples allows to increase the speed of modulation. In the FIG. 13 there is only one stage of separation, including one predistorter even samples block 312 and one predistorter odd samples block 318. Having one stage of separation allows the modulator to double the frequency of input data processing up to the maximum speed supported by the target technology. In one embodiment, the maximum speed supported by the target technology is equal to 40 MHz.

In the alternative embodiment of the present invention (not shown), there are N stages of separation, N is integer, that allows to increase the frequency of input data processing up to [N*times (the maximum speed supported by the target technology)]. In one embodiment, when the maximum speed supported by the target technology is equal to 40 MHz, the frequency of input data processing can be increased up to 2,4 GHz for N=60 stages of separation.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method for compensation for nonlinear distortions during propagation of a QAM signal in a direct propagation channel; said QAM signal including a constellation of at least 16 phasors; said direct propagation channel further comprising a transmitter/modulator side and a receiver/demodulator side; said method comprising the steps of:

monitoring an out-of-band power produced by a nonlinear amplifier (NLA) located at said transmitter/modulator side of said of said direct propagation channel by using a power detector block located at said receiver/demodulator side of said direct propagation channel;

generating a nonlinear distortion compensation signal using a controller at said receiver/demodulator side of said direct propagation channel;

transmitting said nonlinear distortion compensation signal across said direct propagation channel to an input of a pre-distortion block at said transmitter/modulator side of said direct propagation channel;

deriving a magnitude predistortion component;

deriving a rotation predistortion component by using a plurality of fixed predistortion coefficients based on said NLA backoff power level, wherein said NLA backoff power level ensures that said NLA is in a quasi-linear mode of operation; and injecting said predistortion component into said input of said NLA in order to linearize an output signal generated by said transmitter/modulator block.

2. A method for compensation for nonlinear distortions during propagation of a QAM signal in a direct propagation channel; said QAM signal including a constellation of at least 16 phasors; said direct propagation channel further comprising a transmitter/modulator side and a receiver/demodulator side; said method comprising the steps of:

monitoring an out-of-band power produced by a nonlinear amplifier (NLA) located at said transmitter/modulator side of said of said direct propagation channel by using a power detector block located at said receiver/demodulator side of said direct propagation channel;

generating a nonlinear distortion compensation signal using a controller at said receiver/demodulator side of said direct propagation channel;

transmitting said nonlinear distortion compensation signal across said direct propagation channel to an input of a pre-distortion block at said transmitter/modulator side of said direct propagation channel;

deriving a magnitude predistortion component;

deriving a rotation predistortion component by using a plurality of predistortion coefficients based on said demodulator;

injecting said predistortion component into said input of said NLA in order to linearize an output signal generated by said transmitter/modulator block; and adaptively updating said plurality of predistortion coefficients based on said demodulator in order to take into consideration a slow changing external parameter selected from the group consisting of outside temperature, outside humidity, and voltage variations, thus minimizing said nonlinear distortion caused by said NLA in said direct propagation channel.

3. The method of claim 2, wherein said step of adaptively updating said plurality of predistortion coefficients further includes the step of:

feeding back said nonlinear distortion compensation signal with a feedback frequency to take into account said slow changing external parameter, wherein said feedback frequency is higher than a frequency of change of said slow changing external parameter.

4. The method of claim 2, wherein said step of adaptively updating said plurality of predistortion coefficients further includes the step of:

periodically feeding back said nonlinear distortion compensation signal at a predetermined time interval.

5. The method of claim 2, wherein said step of adaptively updating said plurality of predistortion coefficients further includes the step of:

feeding back said nonlinear distortion compensation signal at a variable time interval, wherein said variable time interval depends on said external parameter.

6. A method for compensation for nonlinear distortions during propagation of a QAM signal in a direct propagation channel; said QAM signal including a constellation of at least 16 phasors; said direct propagation channel further comprising a transmitter/modulator side and a receiver/demodulator side; said method comprising the steps of:

monitoring an out-of-band power produced by a nonlinear amplifier (NLA) located at said transmitter/modulator side of said of said direct propagation channel by using a power detector block located at said receiver/demodulator side of said direct propagation channel;

generating a nonlinear distortion compensation signal using a controller at said receiver/demodulator side of said direct propagation channel;

transmitting said nonlinear distortion compensation signal across said direct propagation channel to an input of a pre-distortion block at said transmitter/modulator side of said direct propagation channel;

deriving an inphase amplitude predistortion component;

deriving a quadrature amplitude predistortion component;

injecting said predistortion component into said input of said NLA in order to linearize an output signal generated by said transmitter/modulator block; and calculating at least two constellation compensation errors for each said phasor, a first said constellation compensation error being an averaged compensation error, and a second said constellation compensation error being a "selective" compensation error for a plurality of "selective" phasors located within said QAM constellation.

7. A method for compensation for nonlinear distortions during propagation of a QAM signal in a direct propagation channel; said QAM signal including a constellation of at least 16 phasors; said direct propagation channel further comprising a transmitter/modulator side and a receiver/demodulator side; said method comprising the steps of:

monitoring an out-of-band power produced by a nonlinear amplifier (NLA) located at said transmitter/modulator side of said of said direct propagation channel by using a power detector block located at said receiver/demodulator side of said direct propagation channel;

generating a nonlinear distortion compensation signal using a controller at said receiver/demodulator side of said direct propagation channel;

transmitting said nonlinear distortion compensation signal across said direct propagation channel to an input of a pre-distortion block at said transmitter/modulator side of said direct propagation channel;

deriving an inphase amplitude predistortion component;

deriving a quadrature amplitude predistortion component;

injecting said predistortion component into said input of said NLA in order to linearize an output signal generated by said transmitter/modulator block; and calculating at least two constellation compensation errors for each said phasor, a first said constellation compensation error being an averaged compensation error, and a second said constellation compensation error being an "outside" compensation error for a plurality of "outside" phasors located on a perimeter of said QAM constellation.

8. The method of claim 7, wherein said step of calculating said averaged compensation error, and said "outside" compensation error for each said "outside" phasor further includes the steps of:

calculating a "blind" mode error (BME) for each said "outside" phasor as a reference error, wherein a QAM phasor is defined as a "blind" phasor if said QAM phasor includes a maximum peak power without taking into consideration a phase angle of said QAM phasor;

calculating a decision directed equalization (DDE) error for each said QAM phasor relative to said a "blind" mode reference error (BME); wherein said decision directed equalization (DDE) error for each said QAM phasor indicates an amplitude of error for each said phasor, and indicates a phase angle for said one phasor, and wherein said phase angle for said one phasor is indicative of whether said one phasor is located inside or outside said "blind" power circle; and using a plurality of said "outside" phasors located outside said "blind" power circle to calculate said predistortion compensation signal.

9. A method for compensation for nonlinear distortions during propagation of a QAM signal in a direct propagation channel; said QAM signal including a constellation of at least 16 phasors; said direct propagation channel further comprising a transmitter/modulator side and a receiver/demodulator side; said method comprising the steps of:

monitoring an out-of-band power produced by a nonlinear amplifier (NLA) located at said transmitter/modulator side of said of said direct propagation channel by using a power detector block located at said receiver/demodulator side of said direct propagation channel;

generating a nonlinear distortion compensation signal using a controller at said receiver/demodulator side of said direct propagation channel;

using a reverse feedback service channel to transmit said nonlinear distortion compensation signal; and adjusting a set of parameters of said pre-distortion block by using said nonlinear distortion compensation signal in order to minimize said out-of-band power produced by said non-linear amplifier (NLA).

10. The method of claim 9, wherein said step of using said reverse feedback service channel further includes the step of:

using a microwave reverse service channel.

11. The method of claim 9, wherein said step of using said reverse feedback service channel further includes the step of:

using a fiberoptic reverse service channel.

12. A method for compensation for nonlinear distortions during propagation of a QAM signal in a direct propagation channel; said QAM signal including a constellation of at least 16 phasors; said direct propagation channel further comprising a transmitter/modulator side and a receiver/demodulator side; said method comprising the steps of:

monitoring an out-of-band power produced by a nonlinear amplifier (NLA) located at said transmitter/modulator side of said of said direct propagation channel by using a power detector block located at said receiver/demodulator side of said direct propagation channel;

generating a nonlinear distortion compensation signal using a controller at said receiver/demodulator side of said direct propagation channel;

transmitting said nonlinear distortion compensation signal across said direct propagation channel to an input of a pre-distortion block at said transmitter/modulator side of said direct propagation channel;

adjusting a set of parameters of said pre-distortion block by using said nonlinear distortion compensation signal in order to minimize said out-of-band power produced by said non-linear amplifier (NLA); and separating a plurality of predistortion even samples from a plurality of predistortion odd samples during propagation of said QAM signal in said direct propagation channel, wherein said modulator includes a single stage including a single predistorter of even samples and a single predistorter of odd samples.

13. A method for compensation for nonlinear distortions during propagation of a QAM signal in a direct propagation channel; said QAM signal including a constellation of at least 16 phasors; said direct propagation channel further comprising a transmitter/modulator side and a receiver/demodulator side; said method comprising the steps of:

monitoring an out-of-band power produced by a nonlinear amplifier (NLA) located at said transmitter/modulator side of said of said direct propagation channel by using a power detector block located at said receiver/demodulator side of said direct propagation channel;

generating a nonlinear distortion compensation signal using a controller at said receiver/demodulator side of said direct propagation channel;

transmitting said nonlinear distortion compensation signal across said direct propagation channel to an input of a pre-distortion block at said transmitter/modulator side of said direct propagation channel;

adjusting a set of parameters of said pre-distortion block by using said nonlinear distortion compensation signal in order to minimize said out-of-band power produced by said non-linear amplifier (NLA); and separating a plurality of predistortion even samples from a plurality of predistortion odd samples during propagation of said QAM signal in said direct propagation channel, wherein said modulator includes a plurality of stages, each said stage including a single predistorter of even samples and a single predistorter of odd samples.

* * * * *